M. J. SMITH.
POWER TRANSMISSION BELT.
APPLICATION FILED OCT. 3, 1919.

1,373,457. Patented Apr. 5, 1921.

WITNESS:
Rob't P. Kitchel.

INVENTOR
Manning J. Smith
BY
Frank S. Busser
ATTORNEY.

UNITED STATES PATENT OFFICE.

MANNING J. SMITH, OF PHILADELPHIA, PENNSYLVANIA.

POWER-TRANSMISSION BELT.

1,373,457.  Specification of Letters Patent.  Patented Apr. 5, 1921.

Application filed October 3, 1919. Serial No. 328,231.

*To all whom it may concern:*

Be it known that I, MANNING J. SMITH, a citizen of the United States, residing at Philadelphia, county of Philadelphia, and State of Pennsylvania, have invented a new and useful Improvement in Power-Transmission Belts, of which the following is a full, clear, and exact description, reference being had to the accompanying drawings, which form a part of this specification.

My invention relates to that kind of endless power transmission belt which is formed of a plurality of plies. A known form of such belt comprises two single ply belts secured together in concentric relation, the abutting or overlapping ends of each belt being secured to the other belt by stitching and the two being secured together throughout their length by longitudinal stitching. Another known form of belt comprises a single belt which is wound upon itself to form a belt of double or triple thickness, the ends of the belt being secured to an underlying intermediate part of the webbing, and the several thicknesses being secured together by stitching throughout the length of the belt.

Belts of the construction described are operative and useful, but possess certain defects causing excessive and rapid wear and tend to become otherwise prematurely impaired. One of the most serious defects is the wearing away of the longitudinal stitches, thus destroying or impairing the securing means between the plies of the belt. Again, many belts, due to the manner of their installation, or to the inevitable conditions of installation, are subjected to wear along one or both selvage edges, thereby causing the belt to fray out after the selvage edge is destroyed. Another more or less serious objection is the tendency toward unequal stretching of the plies, thus seriously affecting the efficiency of the belt.

In my improved belt, these objections are overcome. Moreover, my improved belt involves the use of no more material than is used in the fabrication of the ordinary double ply belt and the webbing may be woven with the same facility; the only element of increased cost being the slightly increased amount of labor involved in assembling the elements of the belt, which element of increased cost scarcely affects its selling price and is a negligible factor in comparison with the economy resulting from the increased durability of the belt.

A preferred embodiment of my invention is shown in the accompanying drawings, in which—

Figure 1:
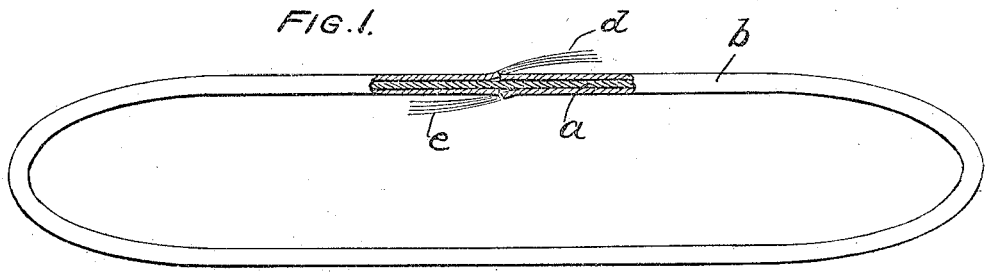
Figure 1 is an edge view of the belt partly broken away with the final joint in unfinished condition.
Figure 2:
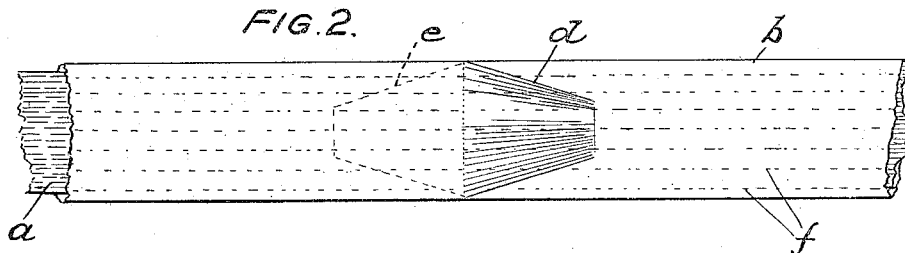
Fig. 2 is a plan view of a portion of the belt with the joint finished.
Figure 3:
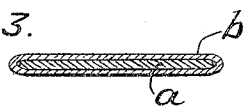
Fig. 3 is a cross-section through one reach of the belt.
Figure 4:
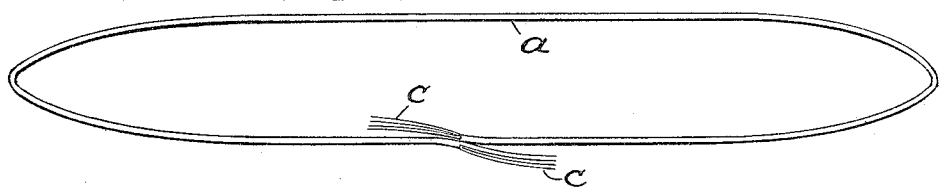
Fig. 4 is an edge view of the inner flat webbing of the belt, the joint being shown in unfinished condition.
Figure 5:
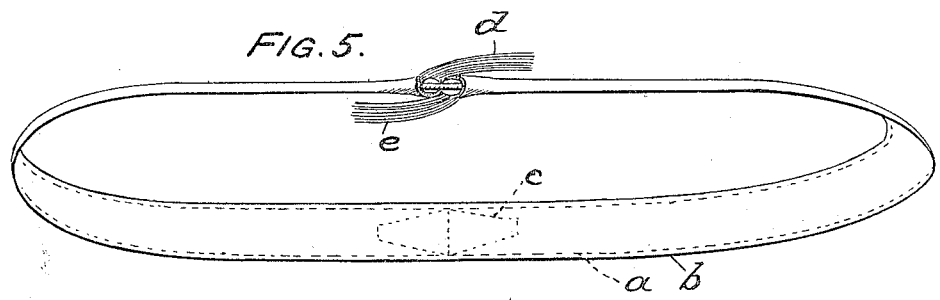
Fig. 5 is a perspective view of the belt of Fig. 1.
Figure 6:
Fig. 6 is a perspective view of one of the ends of the outer tubular webbing.

I first weave an ordinary flat webbing $a$ of a length slightly exceeding the intended circumferential length of the belt. I then weave a tubular webbing or cover $b$, also of a length slightly exceeding the intended circumferential length of the belt. The tubular webbing contains the same number of warp threads and weft threads as the flat webbing; but instead of all the warp threads interlacing with all the weft threads, half the warp threads interweave with half the weft threads in an upper shed of the loom, while the remaining warp threads and weft threads interweave with the remaining weft threads in a lower shed of the loom. The manner of so weaving a tubular fabric is known in the art and need not be further and specifically described.

It will be understood, from the above explanation, that the combined thickness of the two belts is the same as that of two ordinary flat webs.

The flat webbing is then inserted within the tubular webbing or cover and is passed through the same until both webbings about coincide. The extremities of the tubular webbing are then pushed back and the extremities of the flat webbing are then abutted and secured together in any known manner. A preferred way of securing together the extremities of the flat webbing is to fray the ends, preferably by removing the weft, bring the two extremities of the solid part of the webbing together so that they about coincide and secure the frayed-out warp ends $c$, $c$, to the underlying and adjacent solid parts of the webbing by suitable stitching. Alternatively, the frayed sections may be secured together in order that the thickness of the webbing will not be increased at the joint due to the removal of the weft.

The flat webbing has now been formed into an endless belt. This belt is now worked along longitudinally within the cover so that its united ends will be at a greater or less distance from the opposing ends of the tubular webbing or cover *b*.

The opposing ends of the cover *b* are now secured together. Preferably, I proceed as follows. Before the insertion of the flat webbing each end of the tube is frayed throughout half its transverse circumference, the inner half of the tube being frayed at one end and the outer half of the tube at the other end. The ends of the solid part of the tube are then brought into substantially coinciding relation. That is, the extremity of one end of the solid outer half of the tube is brought opposite the other extremity of the solid outer half of the tube, and the extremity of one solid end of the inner half of the tube is brought opposite the other extremity of the solid inner half of the tube. This leaves a frayed end *d* to be secured to the adjacent solid part of the outside of the tube and a frayed end *e* to be secured to the adjacent solid part of the inside of the tube.

The tubular cover *b* is now secured to the belt *a* by longitudinal lines of stitches *f*.

It has been found in practice that even though the longitudinal stitches *f* on the inside of the compound belt may wear away, the two elements of the belt are still held in fixed relation by the outside longitudinal stitches *f* and the driving quality and durability of the belt will not be impaired. Again, in case of the wearing upon either edge of the belt, it is necessary to wear through the edge of the tubular belt before the selvage edge of the inner flat webbing can be attacked and it is necessary to also wear away this selvage edge before any fraying can possibly occur. Again, the tendency to stretch is practically eliminated, because although the outside ply of the belt may tend to stretch, it is restrained from doing so by its integral association with the inside ply of the belt.

It is obvious that if it is desired to make a belt of triple thickness, either the inside belt may be prepared of double thickness, or the tubular belt may be woven throughout of the same thickness as the flat webbing, instead of being woven of half the thickness, as above described.

Having now fully described my invention, what I claim and desire to protect by Letters Patent is:

1. An endless compound power transmission belt comprising an inner flat webbing and an inclosing tubular webbing, the ends of the flat webbing being secured together and positioned between the ends of the tubular webbing and the ends of the tubular webbing being secured together and positioned between the ends of the flat webbing.

2. An endless power transmission belt comprising a tubular webbing, the same at one end being cut away across its inner transverse semi-circumference and frayed across its outer transverse semi-circumference and at the other end being cut away across its outer transverse semi-circumference and frayed across its inner transverse semi-circumference, the frayed ends being secured to an opposing solid portion of the webbing.

3. An endless power transmission belt comprising an inner flat webbing and an inclosing tubular webbing, the latter at one end being cut away across its inner transverse semi-circumference and frayed across its outer transverse semi-circumference and at the other end being cut away across its outer transverse semi-circumference and frayed across its inner transverse semi-circumference, the two frayed extremities being secured to opposing solid faces of the tubular webbing.

4. An endless compound power transmission belt comprising an inner flat webbing of given thickness, and an inclosing tubular webbing having approximately the same yardage and weight of yarn and of a transverse circumference approximating twice the width of the flat webbing, the ends of the flat webbing being secured together between the ends of the tubular webbing and the ends of the tubular webbing being secured together, thereby forming a compound belt having a thickness approximating that of two flat webbings of the given thickness specified.

5. An endless compound power transmission belt comprising an inner flat webbing of given thickness, and an inclosing tubular webbing having approximately the same yardage and weight of yarn and of a circumference approximating twice the width of the flat webbing, the ends of the flat webbing being frayed out and secured together and the ends of the tubular webbing being frayed out semi-circumferentially and secured together, thereby forming a compound belt having a thickness approximating that of two flat webbings of the given thickness specified.

In testimony of which invention, I have hereunto set my hand, at Philadelphia, Pa., on this 1st day of October, 1919.

MANNING J. SMITH.